(12) United States Patent
Park (10) Patent No.: US 11,064,661 B2
(45) Date of Patent: Jul. 20, 2021

(54) SYSTEM FOR OPTIMALLY CONTROLLING SENSORY TEMPERATURE BASED ON HUMIDITY

(71) Applicant: KyungHwa Park, Sangju-si (KR)

(72) Inventor: KyungHwa Park, Sangju-si (KR)

(*) Notice: Subject to any disclaimer, the term of this patent is extended or adjusted under 35 U.S.C. 154(b) by 25 days.

(21) Appl. No.: 15/941,257

(22) Filed: Mar. 30, 2018

(65) Prior Publication Data

US 2018/0255713 A1 Sep. 13, 2018

Related U.S. Application Data

(63) Continuation-in-part of application No. 14/763,833, filed as application No. PCT/KR2013/010005 on Nov. 6, 2013, now abandoned.

(30) Foreign Application Priority Data

Jan. 28, 2013 (KR) .......................... 10-2013-0009490

(51) Int. Cl.
*A01G 9/24* (2006.01)
*G05D 22/02* (2006.01)
(Continued)

(52) U.S. Cl.
CPC ............... *A01G 9/242* (2013.01); *A01G 9/26* (2013.01); *F24F 11/30* (2018.01); *G05D 22/02* (2013.01);
(Continued)

(58) Field of Classification Search
CPC .. A01G 9/242; A01G 9/24; A01G 9/26; F24F 11/053; F24F 2007/005; F24F 7/00;
(Continued)

(56) References Cited

U.S. PATENT DOCUMENTS 6,291,956 B1 * 9/2001 Ku ........................ F24F 11/0079
318/445
6,450,414 B1 * 9/2002 Dartnall .................... F24F 7/10
165/47

(Continued)

FOREIGN PATENT DOCUMENTS

DE 1953220 A1 4/1971
JP 2008170025 A 7/2008
(Continued)

OTHER PUBLICATIONS

Arizona Master Gardner Manual, University of Arizona (Year: 1998).*
English Translation of KR-101171673-B1 (Year: 2012).*

*Primary Examiner* — Marc E Norman
*Assistant Examiner* — Schyler S Sanks
(74) *Attorney, Agent, or Firm* — STIP Law Group, LLC (57) ABSTRACT

The present invention can provide an optimum sensory temperature and can increase productivity by a system having a variable fan provided in a vinyl greenhouse, receiving optimum temperature (A) and humidity (B), detecting internal temperature (A') and humidity (B'), calculating temperature (A") according to the humidity, and providing the temperature (A") suitable for the humidity (B') detected through an operational control of the variable fan.

4 Claims, 3 Drawing Sheets

(51) Int. Cl.
*G05D 23/19* (2006.01)
*F24F 11/30* (2018.01)
*A01G 9/26* (2006.01)
*F24F 110/10* (2018.01)
*F24F 110/20* (2018.01)

(52) U.S. Cl.
CPC ..... *G05D 23/1902* (2013.01); *G05D 23/1919* (2013.01); *F24F 2110/10* (2018.01); *F24F 2110/20* (2018.01)

(58) Field of Classification Search
CPC .. F24F 7/02; F24F 11/0015; F24F 2011/0056; F24F 7/06; F25D 2317/0684
See application file for complete search history.

(56) References Cited

U.S. PATENT DOCUMENTS

| | | | | |
|---|---|---|---|---|
| 6,892,547 | B2* | 5/2005 | Strand | F24F 11/0008 236/44 C |
| 2005/0087614 | A1* | 4/2005 | Ruise | F24F 7/06 236/49.3 |
| 2012/0015597 | A1* | 1/2012 | Foreman | F24F 11/0001 454/239 |

FOREIGN PATENT DOCUMENTS

| | | | |
|---|---|---|---|
| KR | 20060112535 A | | 11/2006 |
| KR | 20120009551 A | | 2/2012 |
| KR | 101171673 B1 | * | 8/2012 |
| WO | WO2013011351 A1 | | 1/2013 |

\* cited by examiner

SYSTEM FOR OPTIMALLY CONTROLLING SENSORY TEMPERATURE BASED ON HUMIDITY

This application is a continuation-in-part of application Ser. No. 14/763,833, filed Jul. 28, 2015, which is a National Phase of PCT Patent Application No. PCT/KR2013/010005 having international filing date of Nov. 6, 2013, which claims the benefit of priority of Korean Patent Application No. 10-2013-0009490 filed on Jan. 28, 2013. The contents of the above applications are all incorporated by reference as if fully set forth herein in their entirety.

TECHNICAL FIELD

The present invention relates to a system for optimally controlling a sensible temperature based on humidity, wherein there is provided a system for controlling the inside of a vinyl house, a greenhouse or a stable to have the optimum sensible temperature, the system including a thermometer and a hydrometer for measuring internal temperature and humidity; a temperature adjustor; and a humidity adjustor, wherein a variable fan formed of a motor and allows external air input to internal and a fan are provided multiple in number, the plurality variable fans being installed on the top of the vinyl house or the stable, thus receiving the optimum temperature (A) and the optimum humidity (B) based on the applied plants or the livestock and receiving an applicable temperature and humidity range of a precise control, so a precise control can be performed by a control unit which receives a humidity unit (Z) which is a criteria for changing temperature, and a humidity unit-compared sensible temperature change value (C), and the applicable temperature and humidity range of a precise control are obtained using the apparatus for adjusting temperature and the apparatus for adjusting humidity, the currently detected temperature (A') and the detected humidity (B') are detected, and if the detected humidity (B') is equal to or higher than the optimum humidity (B), an appropriate temperature (A") is [A−{(B'−B)/Z}×C], and if the detected humidity (B') is lower than the optimum humidity (B), the appropriate temperature (A") is [A+{(B−B')/Z}×C], and if the detected temperature (A') is equal to or lower than the appropriate temperature (A"), the variable fan stops or may rotate at a low output speed for the sake of minimum ventilation, thus increasing the temperatures in the inside of the vinyl house, the greenhouse and the stable, and if the detected temperature (A') is higher than the appropriate temperature (A"), the variable fan operates, and external air is inputted, thus lowering the internal temperature in the inside of the vinyl house, the greenhouse and the stable, so such a system can provide a humidity-considered sensible temperature to the plants or the livestock, thus minimizing any damages due to disease and insects in the plants and minimizing the diseases of livestock, which may result in increased productivity.

BACKGROUND ART

If plants or livestock are mass-raised irrespective of season for the purpose of eating, a vinyl house, a greenhouse or a stable is necessary. Such a vinyl house or a stable should provide optimum environments to plants or livestock for each season, thus increasing productivity while minimizing any damages due to disease and insects.

Among such houses, the vinyl house is configured in such a way that a steel pipe, etc. is bent, thus forming a tunnel-shaped frame, and a covering vinyl of a kind of a vinyl film, for example, a vinyl chloride film, a polyethylene film, etc. is covered fixed over the formed frame. Such a structure is in general used to raise vegetables, flowers, fruits, etc. and can be also used in a livestock sector. In particular, various standards with respect to the sizes and materials determined based on the kinds of vinyl houses are proposed based on the kinds and standards of the universal type vinyl houses for farm houses, which are designed given weather disaster, for example, heavy snow, strong wind, cold wave, etc.

The thusly installed vinyl house has a relatively good heat insulation thanks to its good sealing, but it needs an appropriate air circulation and ventilation so that heating can be provided in winter where temperature is low, and temperature and humidity can be partially maintained rather than the heating in the inside of the vinyl house in summer where temperature is high. For the ventilation method, there are is method for forcibly ventilating by installing a ventilator, a method for forming holes on the top of the vinyl house, a method for rolling up an edge portion of the side of the installed vinyl film, a method for ventilating by installing an opening and closing device at the vinyl house, and a method combined with the above methods.

In addition, the vinyl house aims to provide heat insulation, so the heating is obtained in such a way to increase the internal temperature by operating various heating devices, for example, a boiler, a fan heater, etc. in winter where temperature is low. In this case, the heating is obtained by generating heat in such a way to burn buried resources, for example, solid fuel (coal, briquette, etc.), liquid fuel (oil, etc.) and gaseous fuel (gas, etc.), and to drive a heater or a fan heater which uses electric power.

In addition, the stable is in general formed of walls and a roof. As for other apparatuses for providing an appropriate environment to livestock, there are is heater for heating in winter, a fan or a wind blower (air blowing fan) for lowering internal temperature in summer, a ventilation fan for the sake of internal ventilation, and a humidifier or a dehumidifier for adjusting humidity.

DISCLOSURE OF INVENTION

Technical Problem

In the conventional common vinyl house, if the temperature of the inside of the vinyl house is increased using a heating facility in winter, since warm air ascends, and the temperature at the lower area in the vinyl house becomes lower than the set temperature, it is impossible to maintain a condition appropriate to the growth of plants, and high temperature heat may stay in the upper space of the vinyl house by heating, and the temperature itself inside the vinyl house may be detected very high. In order to lower such temperature, it needs to discharge the stating air of high temperature through a ventilation window provided at the top of the vinyl house, and at the same time cold air is introduced through both sides of the vinyl house. Thanks to the discharge of the high temperature air staying in the top area and the input of cold aid through the lower sides, the air inside the vinyl house fast descends, and at the same time, the moisture on the surfaces of leaves of the plants which stand in the lower area inside the vinyl house and the moisture near the same may evaporate (drying phenomenon), thus causing damages due to disease and insects (powdery mildew, aphid, etc.). Since only the temperature which is necessary for the plants is controlled under the internal environment of the conventional vinyl house, the growths of the plants may be retarded due to the lack of humidity appropriate to the growing environment and the drying phenomenon, which may result in the decrease in harvest.

In case of the stable, there may be provided various apparatuses for adjusting inner temperature and humidity, however since the livestock itself emits heat from body, which is different as compared to the plants, so the internal temperature will rise more quickly than greenhouses in the summer, an air conditioning control is necessary given the state of the livestock. In summer, even though the temperature of the stable which the livestock wants is maintained, the sensible temperature that the livestock actually feels is high because of the wind blowing into the inside of the stable and a high humidity in the inside of the livestock, the health of the livestock may be endangered. In winter, if the heating is performed given only the temperature in the stable, the heat loss from the skin of the livestock may increase by even a small wind at a low humidity (whenever 1 g of moisture evaporates from the skin of the livestock, the energy of 640 calories may lose), so the sensible temperature which is necessary for the livestock may decrease because of a low humidity in the inside of the stable. If the heating is performed given only the temperature, not the humidity, such a heating may be a cause of the stress and disease of the livestock.

In addition, the necessary optimum temperature and humidity frequently change during a day depending on season and growing period until the plants or livestock is shipped. The management based on such a change can be barely changed by manpower.

Solution to Problem

To resolve the above problems, the present invention provides a system for controlling the inside of a vinyl house, a greenhouse or a stable to have the optimum sensible temperature, the system including a thermometer and a hydrometer for measuring internal temperature and humidity; a temperature adjustor; and a humidity adjustor, wherein a variable fan formed of a motor and allows external air input to internal and a fan are provided multiple in number, the plurality of variable fans being installed multiple in number on the top of the vinyl house or the stable, thus receiving the optimum temperature (A) and the optimum humidity (B) based on the applied plants or the livestock and receiving an applicable temperature and humidity range of a precise control, so a precise control can be performed by a control unit which receives a humidity unit (Z) which is a criteria for changing temperature, and a humidity unit-compared sensible temperature change value (C), and the applicable temperature and humidity range of a precise control are obtained using the apparatus for adjusting temperature and the apparatus for adjusting humidity, the currently detected temperature (A') and the detected humidity (B') are detected, and if the detected humidity (B') is equal to or higher than the optimum humidity (B), an appropriate temperature (A") is $[A-\{(B'-B)/Z\} \times C]$, and if the detected humidity (B') is lower than the optimum humidity (B), the appropriate temperature (A") is $[A+\{(B-B')/Z\} \times C]$, and if the detected temperature (A') is equal to or lower than the appropriate temperature (A"), the variable fan stops, and if the detected temperature (A') is higher than the appropriate temperature (A"), the variable fan operates, and external air is inputted, thus lowering the internal temperature in the inside of the vinyl house, the greenhouse and the stable, so such a system can provide a humidity-considered sensible temperature to the plants or the livestock, thus minimizing any damages due to disease and insects in the plants and minimizing the diseases of livestock, which may result in increased productivity.

In addition, the variable fan can rotate in the normal direction or the reverse direction, and the rotation speed of the fan can be adjustable, and the control unit receives a reverse rotation driving temperature, and if the temperature is higher than the reverse rotation driving temperature, the air staying in the upper side is discharged to the outside, and if the detected temperature (A') is equal to or lower than the appropriate temperature (A"), the variable fan stops or operates at a low output speed for at least ventilation, thus increasing the temperature in the inside of the stable, and if the detected temperature (A') is higher than the appropriate temperature (A"), the higher the difference between the detected temperature (A') and the appropriate temperature (A"), the variable fan can operate with higher output, thus quickly lowering the internal temperature in the inside of the vinyl house, the greenhouse and the stable, which may result in the provision of the optimum temperature corresponding to the humidity.

In addition, the control unit inputs, based on the growth period and cycle of the plants or livestock and changes in days and nights, changes and growth of the season, the optimum temperature (A), the optimum humidity (B), the applicable temperature and humidity range of a precise control, the humidity unit (Z), the humidity unit-compared sensible temperature change value (C) and the reverse rotation driving temperature, thus providing the optimum conditions without an additional operation until plants or livestock grow and are sold.

Advantageous Effects

In the present invention, there is provided a system for controlling the inside of a vinyl house, a greenhouse or a stable to have the optimum sensible temperature, the system including a thermometer and a hydrometer for measuring internal temperature and humidity; a temperature adjustor; and a humidity adjustor, wherein a variable fan formed of a motor and allows external air input to internal, and a fan are provided multiple in number, the plurality of variable fans being installed multiple in number on the top of the vinyl house or the stable, thus receiving the optimum temperature (A) and the optimum humidity (B) based on the applied plants or the livestock and receiving an applicable temperature and humidity range of a precise control, so a precise control can be performed by a control unit which receives a humidity unit (Z) which is a criteria for changing temperature, and a humidity unit-compared sensible temperature change value (C), and the applicable temperature and humidity range of a precise control are obtained using the apparatus for adjusting temperature and the apparatus for adjusting humidity, the currently detected temperature (A') and the detected humidity (B') are detected, and if the detected humidity (B') is equal to or higher than the optimum humidity (B), an appropriate temperature (A") is $[A-\{(B'-B)/Z\} \times C]$, and if the detected humidity (B') is lower than the optimum humidity (B), the appropriate temperature (A") is $[A+\{(B-B')/Z\} \times C]$, and if the detected temperature (A') is equal to or lower than the appropriate temperature (A"), the variable fan stops, and if the detected temperature (A') is higher than the appropriate temperature (A"), the variable fan operates, and external air is inputted, thus lowering the internal temperature in the inside of the vinyl house, the greenhouse and the stable, so such a system can provide a humidity-considered sensible temperature to the plants or the livestock, thus minimizing any damages due to disease and insects in the plants and minimizing the diseases of livestock, which may result in increased productivity.

In addition, the variable fan can rotate in the normal direction or the reverse direction, and the rotation speed of the fan can be adjustable, and the control unit receives a reverse rotation driving temperature, and if the temperature is higher than the reverse rotation driving temperature, the air staying in the upper side is discharged to the outside, and if the detected temperature (A') is equal to or lower than the appropriate temperature (A"), the variable fan stops or operates at a low output speed for at least ventilation, thus increasing the temperature in the inside of the stable, and if the detected temperature (A') is higher than the appropriate temperature (A"), the higher the difference between the detected temperature (A') and the appropriate temperature (A"), the variable fan can operate with higher output, thus quickly lowering the internal temperature in the inside of the vinyl house, the greenhouse and the stable, which may result in the provision of the optimum temperature corresponding to the humidity.

In addition, the control unit inputs, based on the growth period and cycle of the plants or livestock and changes in days and nights, changes and growth of the season, the optimum temperature (A), the optimum humidity (B), the applicable temperature and humidity range of a precise control, the humidity unit (Z), the humidity unit-compared sensible temperature change value (C) and the reverse rotation driving temperature, thus providing the optimum conditions without an additional operation until plants or livestock grow and are sold, so the management during the growth period of the livestock is easy, and workers can be saved, and productivity can increase.

BEST MODES FOR CARRYING OUT THE INVENTION

The present invention relates to a system for optimally controlling a sensible temperature based on humidity, wherein there is provided a system for controlling the inside of a vinyl house, a greenhouse or a stable to have the optimum sensible temperature, the system including a thermometer and a hydrometer for measuring internal temperature and humidity; a temperature adjustor; and a humidity adjustor, wherein a variable fan formed of a motor and allows external air input to internal, and a fan are provided multiple in number, the variable fans being installed multiple in number on the top of the vinyl house or the stable, thus receiving the optimum temperature (A) and the optimum humidity (B) based on the applied plants or the livestock and receiving an applicable temperature and humidity range of a precise control, so a precise control can be performed by a control unit which receives a humidity unit (Z) which is a criteria for changing temperature, and a humidity unit-compared sensible temperature change value (C), and the applicable temperature and humidity range of a precise control are obtained using the apparatus for adjusting temperature and the apparatus for adjusting humidity, the currently detected temperature (A') and the detected humidity (B') are detected, and if the detected humidity (B') is equal to or higher than the optimum humidity (B), an appropriate temperature (A") is [A−{(B'−B)/Z}×C], and if the detected humidity (B') is lower than the optimum humidity (B), the appropriate temperature (A") is [A+{(B−B')/Z}×C], and if the detected temperature (A') is equal to or lower than the appropriate temperature (A"), the variable fan stops or may rotate at a low output speed for the sake of minimum ventilation, thus increasing the temperatures in the inside of the vinyl house, the greenhouse and the stable, and if the detected temperature (A') is higher than the appropriate temperature (A"), the variable fan operates, and external air is inputted, thus lowering the internal temperature in the inside of the vinyl house, the greenhouse and the stable, so such a system can provide a humidity-considered sensible temperature to the plants or the livestock, thus minimizing any damages due to disease and insects in the plants and minimizing the diseases of livestock, which may result in increased productivity.

The optimum sensible temperature control system based on humidity according to the present invention can be used for a vinyl house or a greenhouse (for example, a glass greenhouse, etc.) wherein plants grow, a stable for raising livestock, etc. The vinyl house will be described as a representative example. The occasion where the system applies to the stable will be additionally described.

First, the structure of the vinyl house and the common temperature and humidity control apparatus (common control apparatus, conventional control apparatus) will be described. The vinyl house is built in such a way that a steel reinforcement or a steel pipe, etc. is bent into a tunnel-shaped frame. A covering vinyl of the kind of a vinyl film, for example, a vinyl chloride film, a polyethylene film, etc. is covered over the frame. This vinyl house may be formed in a one-layer structure or in a two-layer structure. The vinyl house structure of a two-layer structure in FIG. 1 will be described. First, a tunnel-shaped frame 11 is formed. A covering vinyl 12 is covered over the frame 11, thus forming an inner skin unit 10. A tunnel-shaped frame 21 is formed spaced a predetermined distance outwards from the inner skin unit 10, and the covering vinyl 22 is covered over the frame, thus forming an outer skin unit 20.

Figure 1:
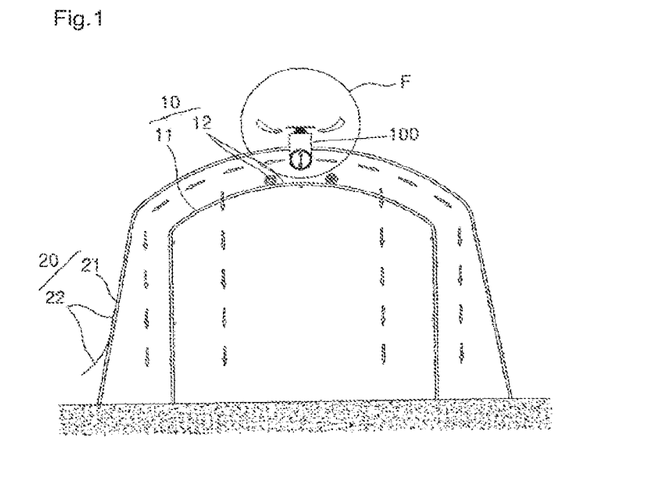
FIG. 1 is a cross sectional view illustrating a state where a precise control system has applied to a vinyl house according to the present invention.

In addition, a ventilation unit is provided at both side surfaces of the inner skin unit 10 and the outer skin unit 20, wherein the ventilation unit can be opened or closes as it is rolled up lengthwise or is rolled down. Here, the operations of the ventilation unit may be implemented in a manual way or a mechanical way, an electric way, a hydraulic way, etc. The opening and closing operations and controls of the ventilation unit of the inner layer unit are performed by the control unit which will be described later. The configuration of such a ventilation unit is same as the configuration of the typical vinyl house, so the detailed description thereon will be omitted.

As compared thereto, the stable may be formed of a relatively robust wall and roof given the movements of the livestock, and the stable like the structure of the vinyl house may be used depending on the kind of livestock.

A thermometer and a hydrometer capable of measuring and detecting temperature and humidity may be provided inside the vinyl house. The thermometer and the hydrometer may be configured in such a way that the temperature and humidity can be detected by a temperature sensor and a humidity sensor. The temperature and the humidity detected by the thermometer and the hydrometer are transferred to the control unit.

Meanwhile, the thermometer and the hydrometer are installed at the height determined given the heights of the plants growing inside the vinyl house and are preferably configured to detect the temperature and humidity which may have effects on the plants. In case of the stable, the thermometer and the hydrometer are installed given the height of the animal. The thermometer and the hydrometer may be installed at multiple positions given the heights (stature) of the plants or the livestock used for realizing internal state of the vinyl house and the stable. If the thermometer and the hydrometer may be installed at different heights, if necessary, the differences in the temperature and the humidity between the upper portion and the lower portion may be recognized.

In addition, a heater and an air blower may be further provided in the vinyl house so as to adjust temperature. The heater allows to increase the internal temperature of the vinyl house, and for this, various boilers (oil boiler, briquette boiler, wood boiler, etc.) may be used. The air blower may be an air blower which is able to blow wind into the inside of the vinyl house or an air conditioning unit (air conditioner) which is able to drop the internal temperature with electric power. The air blower can blow wind with the aid of the rotation of the air blowing fan. The air blowing fan may be provided multiple in number. If there is a low internal temperature difference as compared to the set temperature (optimum temperature), only a couple of air blowing fans may be used to lower the temperature. The higher the internal temperature as compared to the set temperature (optimum temperature), add more the number of the air blowing fans, thus quickly lowering the internal temperature. It is common for the air blower to lower the internal temperature as well as to perform ventilation. The position of the air blower (air blowing fan) may be the top or a side surface of the vinyl house. Such a heater and air blower may apply to the stable.

In addition, a humidifier and a dehumidifier may be further provided in the inside of the vinyl house. The humidifying apparatus allows to spray water in the form of mist into the inside of the vinyl house, thus increasing the level of humidity in the inside of the vinyl house. The dehumidifying apparatus may use an indirect method with the aid of ventilation or may use a dehumidifier. Such a humidifier and dehumidifying apparatus may apply to the stable.

The above-described heater, air blower, humidifying apparatus and dehumidifying apparatus may be apparatuses which have been in general used for the vinyl house and the stable so as to control temperature and humidity. The temperature and humidity are controlled by such apparatuses. The temperature and the humidity will be controlled using typical control units based on the detected temperature and humidity. The operations and controls of the heater and the water supply apparatus are performed by the control unit which will be described later.

Figure 2:
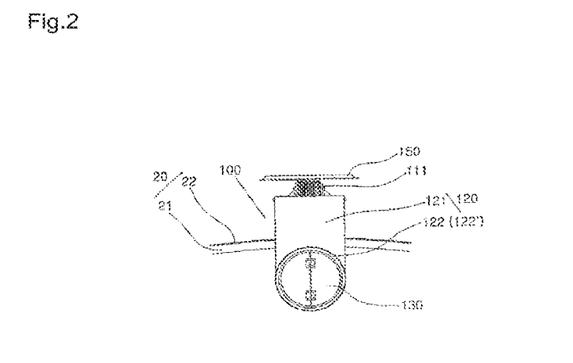
FIG. 2 is an enlarged view of the portion F in FIG. 1.
Figure 3:
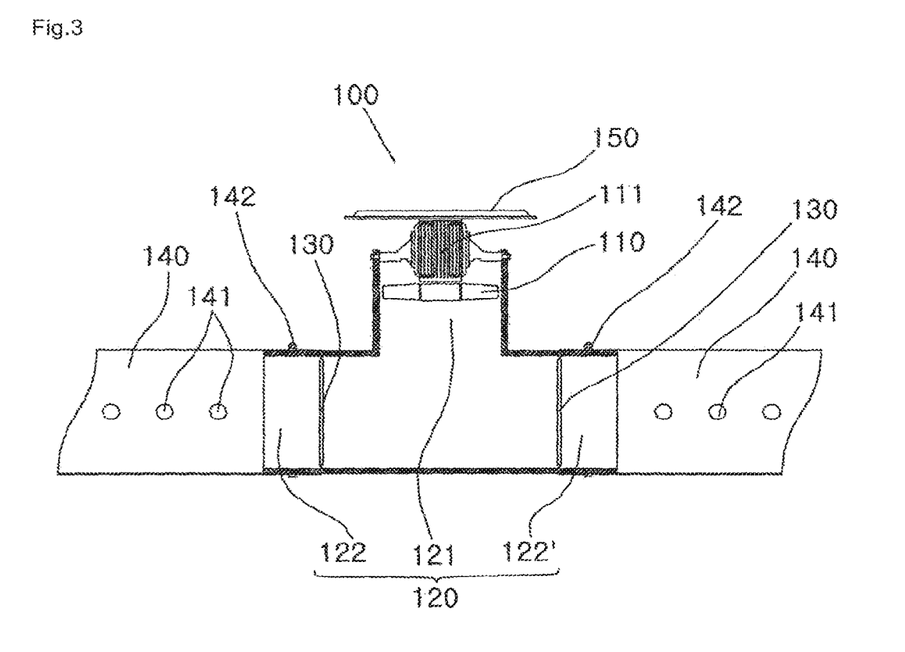
FIG. 3 is a side cross sectional view of the portion in FIG. 2.

In addition, for the sake of precise control according to the present invention, a variable fan 100 may be further necessary. Referring to FIGS. 2 and 3, the variable fan 100 may include, but is not limited to, a tee pipe 120, a fan 110, a motor 111, etc. The tee pipe 120 is configured in a tubular T-shaped structure and includes two straight line-shaped outlets 122 and 122', and a vertical inlet 121 connected to the middle of the two straight line-shaped outlets 122 and 122'. A fan 110 is installed at an end portion of the inlet 121, so external air is inputted by the operation of the fan 110 and discharges to the side of outlets 122 and 122'. The variable fan 100 is formed of a motor 111, and a fan 110 which operates by the motor 111. A shielding unit 150 (a plate shape, a conical shape, etc.) larger than the cross section of the inlet 121 is provided integral on the top of the fan 110. The shielding unit 150 allows to prevent rain, snow, other impurities, etc. from entering the inside of the variable fan 100.

Meanwhile, the motor 111 which rotates the fan 110 of the variable fan 100 is a variable motor, thus allowing for the control of the speed (rotation). The speed of the fan 110 can change step by step by the motor 111. The motor 111 can rotate in the normal direction or the reverse direction. When the fan 110 of the variable fan 100 rotates normally, wind can blow from the outside of the vinyl house to the inside thereof. When the variable fan 100 rotates reversely, the air discharges from the inside of the vinyl house to the outside.

An opening and closing plate 130 is provided at the inner circumferential portions of both ends of the outlets 122 and 122'. Referring to FIG. 1, the opening and closing plate 130 is assembled in a circular plate shape or a circular plate shape wherein the above circular plate is split into two parts, and the split two circular plates are assembled into a circular plate shape. At least one opening and closing plate 130 has a structure which can unfold in two directions since it is hinge-assembled. The opening and closing of the opening and closing plate 130 will be controlled by a separate motor (not illustrated). The operation of the motor will be controlled by a control unit which will be described later. When the fan 110 rotates in the normal direction or the reverse direction, the opening and closing plate 130 opens, and when the fan 110 does not operate, the opening and closing plate 130 is intended to block the outlets 122 and 122' of the tee pipe 120.

In addition, the variable fan 100 is installed multiple in number along the upper side of the vinyl house. The outlets 122 and 122' positions inside the vinyl house, and the lengths of the outlets 122 and 122' are arranged identical with the lengthwise direction of the vinyl house, and the inlet 121 is installed outside the vinyl house. If the vinyl house has a double layer structure, the outlets 122 and 122' are disposed between the outer skin unit and the inner skin unit. In the above installation, when the fan 110 of the inlet 121 is driven, external air passes through the variable fan 100 and the opening and closing plate 130 and moves into the inside of the vinyl house 100. The rotation direction and the speed of the variable fan 100 will be controlled by the control unit which will be described later.

In addition, an air supply passage unit 140 is installed at each of the outlets 122 and 122' of the variable fan 100 installed at the vinyl house. The air supply passage unit 140 may be formed of a conduit, a pipe or a vinyl, etc. and is formed in a structure wherein an outlet hole 141 which passes through along the lengthwise direction. The air supply passage unit 140 is inserted into the ends of the outlets 122 and 122' and is fixed by a band or other fixing means 142. The air supply passage unit 140 is formed along the lengthwise direction of the vinyl house. The air supply passage unit 140 is fixed at the frame of the vinyl house and along the lengthwise direction.

The variable fan 100 which is installed at the vinyl house, applies identically to the stable. If the inner space of, for example, the vinyl house, the greenhouse, the stable, etc. is large, the variable fan 100 may be installed multiple in number like in the air blowing fan, thus adjusting the number of the operating variable fans 100 depending on the temperature condition. For this, it is preferred that the variable fans 100 or the air blowing fans may be tied into a couple of groups, which will be operated step by step depending on the difference in temperature (temperature difference to be changed).

Figure 4:
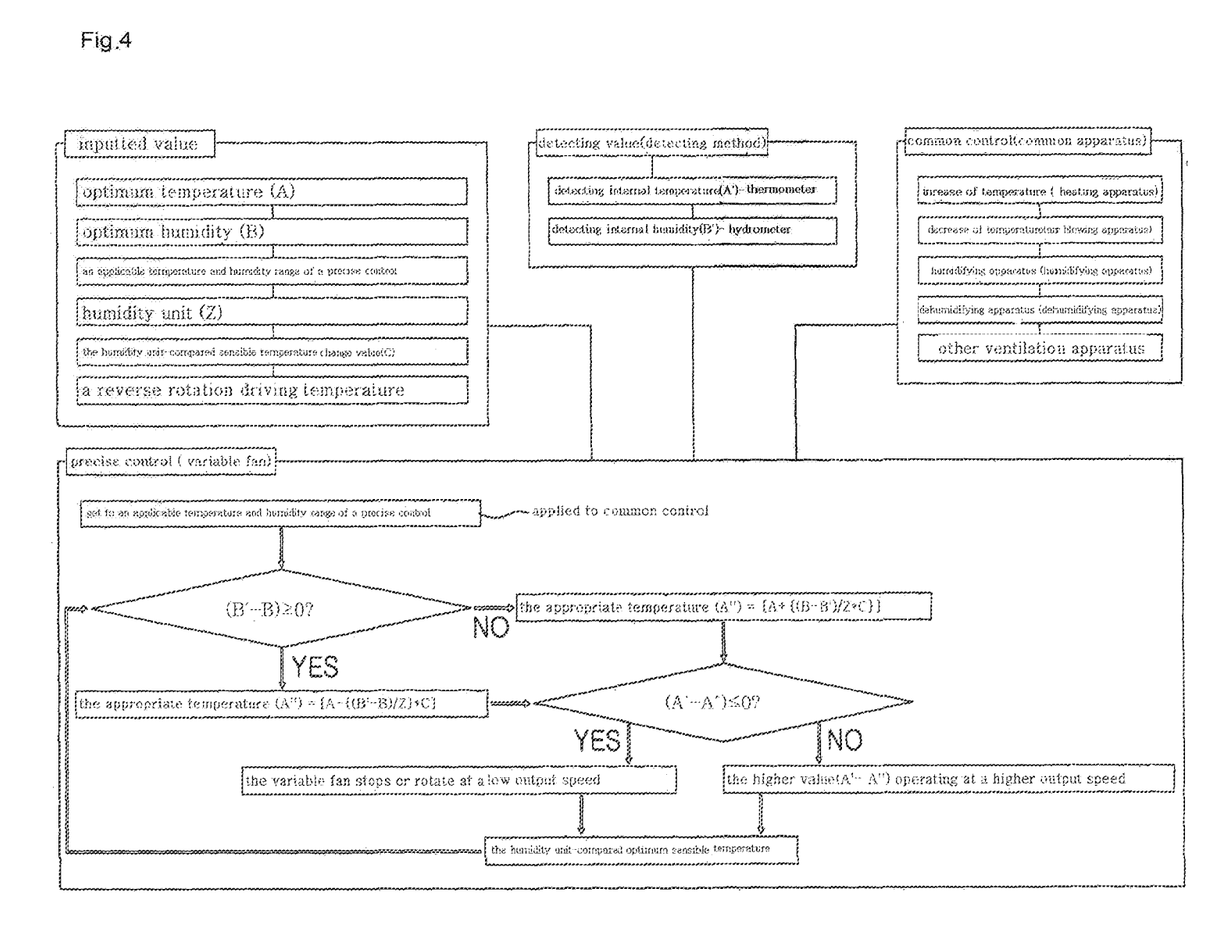
FIG. 4 is a schematic view illustrating the kinds of an apparatus which is included in a precise control system and a control method thereof according to the present invention.

Finally, the control unit detects the temperature and humidity inside the vinyl house or the stable, thus controlling to the temperature and humidity which are optimum to the plants inside the vinyl house. In other words, the currently detected temperature (A') and the detected humidity (B') are detected using the thermometer and the hydrometer installed inside the vinyl house by receiving the optimum temperature (A) and the optimum humidity (B) based on the plants and livestock, thus controlling the system to provide the optimum sensible temperature based on the humidity through the heater, the air blower, the humidifying apparatus, the dehumidifying apparatus and the variable fan 100. Referring to FIG. 4, the above control system is performed a common control and a precise control based on the ranges of the temperature and the humidity. The previously inputted optimum temperature (A) and the optimum humidity (B) may typically differ based on the kinds of the plants or the livestock.

Meanwhile, the control unit receives an applicable temperature and humidity range of a precise control, a humidity unit (Z) which is a criterion for changing temperature, a humidity unit-compared sensible temperature change value (C) and a reverse rotation driving temperature. First, as for the reverse rotation driving temperature, if the internal temperature inside the vinyl house, the greenhouse or the stable exceeds a set reverse rotation driving temperature, the variable fan 100 rotates reversely, thus discharging a plenty of hot heat and humidity staying in the upper side to the outside, which may result in the decreases in the internal temperature and humidity. It is common that the reverse rotation driving temperature may differ from the kinds of plants or livestock.

In addition, the range of the applicable temperature and humidity of the precise control is set as a range for the temperature and humidity optimized to the humidity through the variable fan 100. The applicable temperature range of the precise control is set as a range including the optimum temperature (A). It is possible to input two values which represent the temperature range (if the applicable temperature range of the precise control is X~X' ° C., X and X' are inputted) or to input the plus and minus values (±) with respect to the optimum temperature (A) (if the applicable temperature range of the precise control is the optimum temperature (A)±X'° C., X" is inputted). In this way, the applicable humidity range of the precise control is set as a range including the optimum humidity (B). It is possible to input two values which represent the range of the humidity (if the applicable humidity range of the precise control is Y~Y'%, Y and Y' are inputted) or to input the plus and minus value (±) with respect to the optimum humidity (B) (if the applicable humidity range of the precise control is the optimum humidity (B)±Y"%, Y" is inputted).

At the temperature and humidity where the inputted applicable temperature and humidity ranges of the precise control is deviated, the typical controls can be performed through the common apparatus, for example, the heater, the air blower, the humidifying apparatus, the dehumidifying apparatus, etc. In other words, at the temperature which is out of the applicable temperature and humidity range of the precise control, the temperature is changed for it to be in the applicable temperature and humidity range of the precise control with the aid of the heater and the air blower or at the humidity which is out of the applicable temperature and humidity range of the precise control, the humidity is controlled for it to be in the applicable humidity range of the precise control with the aid of the dehumidifying apparatus or the humidifying apparatus. It is obvious that the applicable temperature and humidity range of the precise control differs from each other based on the kinds of the plants and the livestock.

In addition, the humidity unit (Z) is a criteria unit value of the humidity which allows the temperature to change. If the humidity has a difference corresponding to humidity unit, it is possible to provide the temperature corresponding to the humidity by varying the temperature. The smaller the humidity unit (Z), the more sensible the change in the temperature even though the difference between the detected humidity (B') and the optimum humidity (B) is small. The humidity unit (Z) is set in a range of 1 to 10%. For example, if the humidity unit is 5%, the temperature change is not made in case where the difference between the detected humidity (B') and the optimum humidity (B) is below 5%, and if the difference is over 5%, the temperature change is made by multiplying the humidity unit-compared sensible temperature change value (C), and the humidity unit-compared sensible temperature change value (C) means a change value of the temperature which the plants or the livestock can actually sense when the humidity rises or lowers as high as humidity unit.

Meanwhile, the humidity unit (Z) and the humidity unit-compared sensible temperature change value (C) are derived from the experimental data and result which are related with the temperature and humidity during the cultivation of the plants and the raising procedure of the livestock. Therefore, it is obvious that the humidity unit and the humidity unit-compared sensible temperature change value differ from each other based on the kinds of the plants and the livestock.

In the above way, the control unit receives, in accordance with the plants and livestock, the optimum temperature (A), the optimum humidity (B), the applicable temperature and humidity range of the precise control, the humidity unit (Z), the humidity unit-compared sensible temperature change value (C) and the reverse rotation driving temperature and detects the current internal temperature and humidity, namely, the detected temperature (A') and the detected humidity (B') inside the vinyl house, the greenhouse, or the stable, etc. If such ranges are out of the applicable temperature and humidity ranges of the precise control, the system is driven so that the inside of the vinyl house, the greenhouse or the stable is included into the applicable temperature and humidity range of the precise control in accordance with the common control ways.

For reference, the optimum temperature (A), the optimum humidity (B), the applicable temperature and humidity range of the precise control, the humidity unit (Z), the humidity unit-compared sensible temperature change value (C), the reverse rotation driving temperature, etc. may change depending on the kinds of the plants and the livestock, seasons (four seasons, spring, summer, autumn, winter) as well as days and nights and the growths of the plants and the livestock. Here, the optimum temperature (A) is inputted at every 0.1° C. within a range of 0~45° C., and the optimum humidity (B) is inputted at every 1% within a range of 0~100%, and the applicable temperature of the precise control is set within a range of the optimum temperature (A)±10%, and the applicable humidity of the precise control is set within a range of the optimum humidity (B)±30%, and the humidity unit (Z) is set within a range of 1~10%, and the humidity unit-compared sensible temperature change value (C) is inputted in a range of 0.1 to 5° C., and the reverse rotation driving temperature is inputted in a range of 0~45° C.

Since the values which have been variously inputted in the above ways may change in accordance with the kinds of the plants and the livestock, seasons (four seasons, spring, summer, autumn, winter) as well as days and nights and the growths of the plants and the livestock, the control unit needs the previous inputs of the optimum temperature (A), the optimum humidity (B), the applicable temperature and humidity range of the precise control, the humidity unit (Z), the humidity unit-compared sensible temperature change value (C), and the reverse rotation driving temperature which are all based on the changes in the days and nights and the changes in the seasons and the growth with respect to the period and cycle of the growth. Therefore, it does not need to input such values until the seedling grow and are harvested or baby livestock animals grow and are sold, so the plants can grow under the optimum conditions in accordance with a control of the control unit and the livestock can be raised in the above way.

If the inside of the vinyl house, the greenhouse or the stable is within a range of the condition of the applicable temperature and humidity of the precise control, the humidity (B') detected in the vinyl house or the stable is compared to the optimum humidity (B), thus calculating an appropriate "appropriate temperature (A")'.

First, if the detected humidity (B') is equal to or higher than the optimum humidity (B) [(B'−B)≥0], since a sensible temperature is high since the humidity is high as compared to the optimum temperature (A), the temperature which has been lowered given the humidity rather than the optimum temperature (A) may be an appropriate temperature (A"). At this time, the appropriate temperature (A") is [A−{(B'−B)/Z}×C]. In other words, the difference between the detected humidity (B') and the optimum humidity (B) is divided by the humidity criteria unit, which allows for the change in the temperature, namely, the humidity unit (Z), and is then multiplied with the humidity unit-compared sensible temperature change value (C). The thusly obtained value is a temperature value which should be lowered with respect to the optimum temperature (A). At this time, if the detected temperature (A') is equal to or smaller than the appropriate temperature (A") [(A'−A")≤0], the variable fan 100 may stop or may rotate at a low output speed for the sake of minimum ventilation, thus increasing the temperature in the inside of the vinyl house, the greenhouse or the stable. If the detected temperature (A') is higher than the appropriate temperature (A"), the variable fan 100 operates to lower the internal temperature in the inside of the vinyl house, the greenhouse, the stable, etc. The higher the difference between the detected temperature (A') and the appropriate temperature (A") (the higher the absolute value (|B'−B|) of (B'−B)), the faster the temperature is lowered by operating at a high output speed.

In addition, if the detected humidity (B') is lower than the optimum humidity (B) [(B'−B)<0], since the humidity is lower as compared to the optimum temperature (A), the sensible temperature is low, so the temperature which has been increased given the humidity as compared to the optimum temperature (A) is an appropriate temperature (A"). At this time, the appropriate temperature is [A+{(B−B')/Z}×C], in other words, the difference between the optimum humidity (B) and the detected humidity (B') is divided by the humidity criteria unit, which allows for the change in the temperature, namely. The humidity unit (Z), and the value obtained by multiplying it with the humidity unit-compared sensible change value (C) is a temperature value which increases with respect to the optimum temperature (A). At this time, if the detected temperature (A') is equal to or lower than the appropriate temperature (A") [(A'A")≤0], the system stops or rotates at a low output speed for the sake of at least necessary ventilation, thus increasing the internal temperature in the inside of the vinyl house, the greenhouse or the stable. If the detected temperature (A') is higher than the appropriate temperature (A"), the variable fan 100 operates to lower the internal temperature in the inside of the vinyl house, the greenhouse or the stable. The higher the absolute value (|B'−B|) of (B'−B) (the higher the difference between the detected temperature (A') and the appropriate temperature (A")), the higher the output of the system operation, thus quickly lowering the temperature.

For example, when growing cucumber as a vegetable of the vinyl house in winter, the system is set so that the optimum temperature for the growth of cucumber can be 25° C., and the optimum humidity can be 60%, and the applicable temperature and humidity range of the precise control is 15 to 30° C., and the humidity is 40 to 80%, and the humidity unit is 5%, and the humidity unit-compared sensible temperature change value (C) is 0.5° C., and the reverse rotation driving temperature is 35° C., thus quickly increasing, using the heater, the internal temperature inside the vinyl house wherein the humidity and temperature are low, thus obtaining an applicable temperature and humidity range of a precise control with the aid of the heater (during the above procedure, if the humidity is out of a predetermined humidity, the humidifying apparatus is used). If the detected temperature is 25° C., and the detected humidity is 40%, since the detected humidity is lower than the optimum humidity, the formula [A+{(B−B')/Z}×C] may be used. Therefore, the appropriate temperature is 27° C. from the calculation of [25+{(60−40)/5}×0.5]. Since the detected temperature is lower than the appropriate temperature, it is possible to maintain the heater or increase the internal temperature by 2° C. by the heat from the livestock in such a way to stop the operation of the variable fan 100 or to use at least output, so the sensible temperature appropriate for the growth of cucumber can be obtained.

Since only the temperature is controlled without considering the humidity with respect to the matters in the inside of the conventional vinyl house, the greenhouse or the stable, the temperature may be different from the sensible temperature which plants or livestock actually feels, so productivity is lowered because of the big concerns about the occurrence of disease and insects. The optimum sensible temperature control system which operates based on the humidity according to the present invention can provide the humidity-considered optimum temperature with the aid of the operations of the variable fan 100, thus providing a temperature and humidity which are appropriate to the plants and the livestock, which leads to higher productivity. If the humidity is low and the temperature is high in terms of the internal environments inside the vinyl house, the greenhouse, the livestock, etc. at nights during the in-between seasons or in winter, the temperature can be lowered by inputting external air using the variable fan 100 given the sensible temperature, and the upper air which has higher temperature and humidity than in the lower air can circulate in the lower sides, thus providing a temperature which is appropriate to the plants or the livestock. In other words, since it is possible to provide an appropriate growing environment even at a temperature lower than in the conventional system, the cost for heating can be saved, and such a system is economical, while enhancing productivity.

What is claimed is:

1. A system for controlling temperature and humidity of the inside of a vinyl house, a greenhouse or a stable, comprising:
    a heater;
    an air blower;
    a humidifier or a dehumidifier;
    multiple thermometers and multiple hydrometers, wherein each of the multiple thermometers and each of the multiple hydrometers detect a currently detected temperature (A') and a currently detected humidity (B') of the inside of the vinyl house, the greenhouse or the stable, respectively, wherein the multiple thermometers and the multiple hydrometers are installed at multiple positions and heights determined given heights of plants or livestock grown inside of the vinyl house, the greenhouse or the stable;
    a temperature adjustor;
    a humidity adjustor;
    a controller, wherein the controller adjusts the internal temperature of the inside of the vinyl house, the greenhouse or the stable to a humidity-considered sensible temperature; and
    a plurality of variable fans,
    wherein,
    each of the plurality of variable fans is formed of a motor and a fan, and the plurality of variable fans are installed on a top of the vinyl house, the greenhouse, or the stable,
    the controller contains information, wherein the information includes an optimum temperature (A) and an optimum humidity (B), an applicable temperature and humidity range, a humidity unit (Z) which is a criterion for changing temperature, and a humidity unit-compared sensible temperature change value (C), wherein the applicable temperature and humidity range is determined according to the temperature adjustor and the humidity adjustor,
    wherein,
    when the detected humidity (B') is equal to or higher than the optimum humidity (B), an appropriate temperature (A") is [A−{(B'−B)/Z}×C], and
    when the detected humidity (B') is lower than the optimum humidity (B), the appropriate temperature (A") is [A+{(B−B')/Z}×C], and
    when a difference between the detected humidity (B') and the optimum humidity (B) is below the humidity unit (Z), the controller does not adjust the internal temperature,
    the plurality of variable fans are configured to stop when the detected temperature (A') is equal to or lower than the appropriate temperature (A") to increase an internal temperature of the inside of the vinyl house, the greenhouse or the stable, and
    the plurality of variable fans are configured to operate to input external air into the vinyl house, the greenhouse or the stable when the detected temperature (A') is higher than the appropriate temperature (A") to lower the internal temperature of the inside of the vinyl house, the greenhouse or the stable, and
    the optimum temperature (A), the optimum humidity (B), the humidity unit (Z), and the humidity unit-compared sensible temperature change value (C) are determined according to changes of day, night, and season with respect to a growth period and cycle of plants or livestock grown inside of the vinyl house, the greenhouse or the stable, and are saved in the controller such that an additional operation is not necessary until the plants or the livestock grow,
    the humidity unit (Z), and the humidity unit-compared sensible temperature change value (C) are derived from experimental data related with temperature and humidity during cultivation of the plants or raising procedure of the livestock, and differ from each other according to the plants and the livestock.

2. The system of claim 1,
    wherein each of the plurality of variable fans is capable of rotating in a normal direction or a reverse direction, and a rotation speed of the each of the plurality of variable fans is adjustable, and a reverse rotation driving temperature is stored in the controller,
    wherein,
    when the internal temperature is higher than the reverse rotation driving temperature, air staying in an upper side of the vinyl house, the greenhouse, or the stable is discharged to the outside of the vinyl house, the greenhouse, or the stable,
    when the detected temperature (A') is equal to or lower than the appropriate temperature (A"), one or more of the plurality of variable fans stop or operate to decrease output speed for at least ventilation, thus increasing the internal temperature of the vinyl house, the greenhouse, or the stable, and
    when the detected temperature (A') is higher than the appropriate temperature (A"), the higher the difference between the detected temperature (A') and the appropriate temperature (A"), one or more of the plurality of variable fans operate to increase output speed, thus lowering the internal temperature of the vinyl house, the greenhouse, or the stable,
    wherein,
    when the each of the plurality of variable fans rotates in the normal direction, air blows from the outside of the vinyl house, the greenhouse, or the stable to the inside thereof, and
    when the each of the plurality of variable fans rotates in the reverse direction, air is discharged from the inside of the vinyl house, the greenhouse, or the stable to the outside of the vinyl house, the greenhouse, or the stable.

3. The system of claim 1,
    wherein the each of the plurality of variable fans further comprises a tee pipe, a shield, and an opening and closing plate,
    wherein the tee pipe is formed in a tubular T-shaped structure and comprises two outlets and a vertical inlet,
    wherein each of the two outlets is formed at each end of the tee pipe and is aligned along the longitudinal direction of the vinyl house, the greenhouse, or the stable,
    the vertical inlet is formed vertically with respect to the two outlets such that external air is inputted through the vertical inlet by operating the motor of each of the plurality of variable fans, and
    wherein the shield is formed above the vertical inlet and is wider than the vertical inlet such that the shield prevents input of water or impurities from entering inside the each of the plurality of variable fans, and
    the opening and closing plate is formed at the inner circumferential portion of the each of the two outlets and is assembled in a circular plate with the same shape as cross-section of the each of the two outlets such that the opening and closing plate opens or closes the each of the two outlets, the opening and closing plate is controlled by the controller to open the each of the two outlets when the each of the plurality of fans operates and to block the each of the two outlets when the each of the plurality of fans does not operate, and a tubular air supply passage unit having a plurality of through outlet holes is provided at the each of the two outlets, thus inputting external air into the inside of the vinyl house, the greenhouse, or the stable, wherein the plurality of through outlet holes are aligned along the longitudinal direction of the two outlets.

4. The system of claim 2, wherein the each of the plurality of variable fans further comprises a tee pipe, a shield, and an opening and closing plate, wherein the tee pipe is formed in a tubular T-shaped structure and comprises two outlets and a vertical inlet, wherein each of the two outlets is formed at each end of the tee pipe and is aligned along the longitudinal direction of the vinyl house, the greenhouse or the stable, the vertical inlet is formed vertically with respect to the two outlets such that external air is inputted through the vertical inlet by operating the motor, and wherein the shield is formed above the vertical inlet and is wider than the vertical inlet such that the shield prevents input of water or impurities from entering inside the each of the plurality of variable fans, and the opening and closing plate is formed at the inner circumferential portion of the each of the two outlets and is assembled in a circular plate with the same shape as cross section of the each of the two outlets such that the opening and closing plate opens or closes the each of the two outlets, the opening and closing plate is controlled by the controller to open the each of the two outlets when the each of the plurality of fans operates and to block the each of the two outlets when the each of the plurality of fans does not operate, and a tubular air supply passage unit having a plurality of through outlet holes is provided at the each of the two outlets, thus inputting external air into the inside of the vinyl house, the greenhouse, or the stable, wherein the plurality of through outlet holes are aligned along the longitudinal direction of the two outlets.

* * * * *